UNITED STATES PATENT OFFICE.

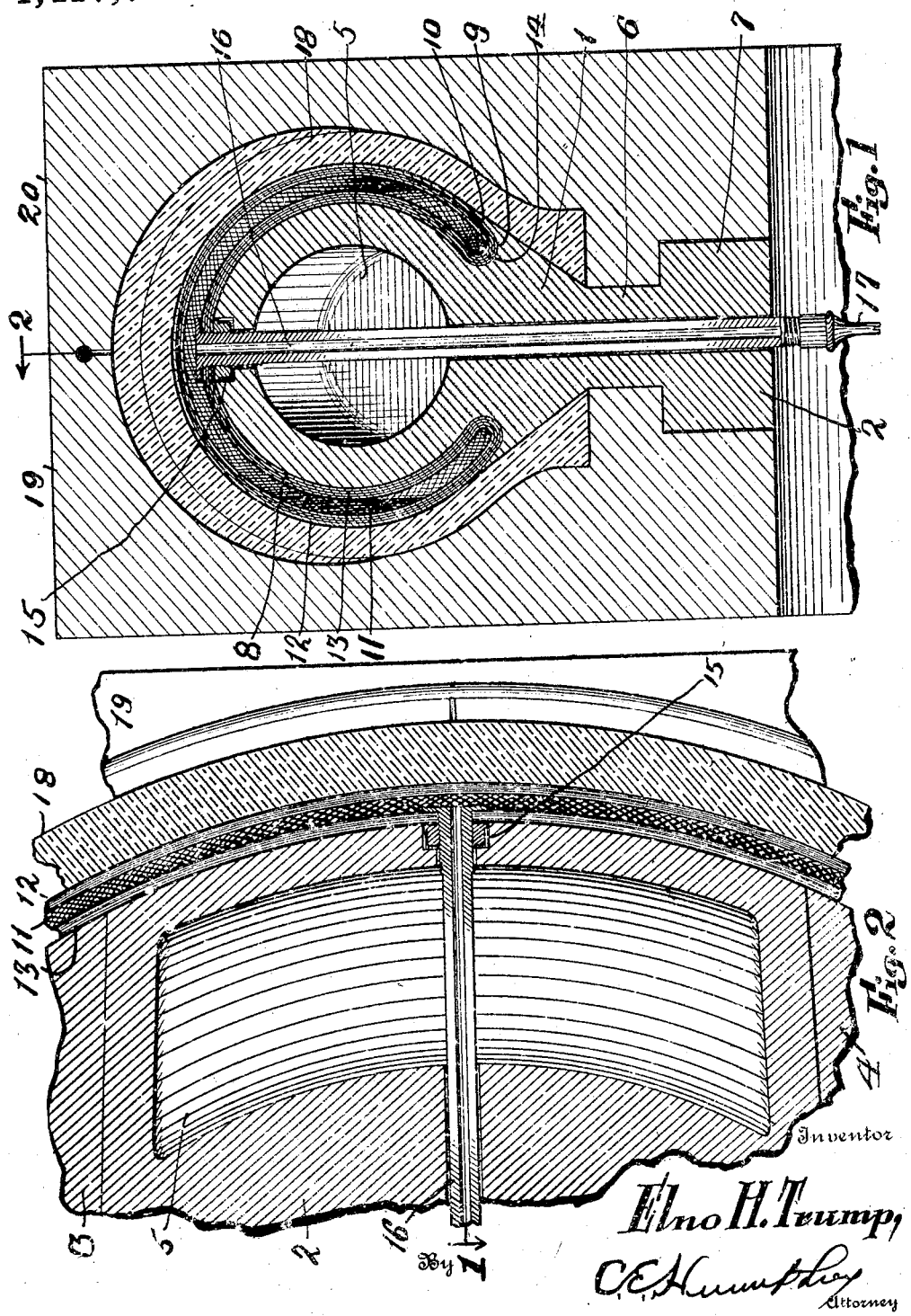

ELNO H. TRUMP, OF SEBRING, OHIO, ASSIGNOR OF ONE-HALF TO JOHN M. ALDERFER, OF AKRON, OHIO.

APPARATUS FOR MAKING PNEUMATIC TIRES.

1,417,701.  Specification of Letters Patent.  Patented May 30, 1922.

Application filed November 24, 1917. Serial No. 203,722.

*To all whom it may concern:*

Be it known that I, ELNO H. TRUMP, a citizen of the United States, residing at Sebring, in the county of Mahoning and State of Ohio, have invented new and useful Improvements in Apparatus for Making Pneumatic Tires, of which the following is a specification.

This invention has relation to improvements in cores for the manufacture of the outer casing or tire shoes of double tube pneumatic tires and the objects thereof are to provide an improved core, in association with which is employed an air bag by which the fabric and carcass of the tire shoe may be stretched and straightened either previous to or during the vulcanizing operation.

More specifically it may be stated that the invention pertains to that type of core which is commonly employed in the manufacture of automobile casings or tire shoes, wherein it is desirable to stretch the fabric or completed tire shoe, either preliminary to or during the vulcanization thereof and it is especially adaptable for use in connection with a sectional core such as is commonly employed for the manufacture of tire casings or tire shoes.

It is of course well known to those skilled in the art, that the cores now almost universally employed are of sectional conformation, wherein the sections are united together temporarily during the building up and vulcanization of the shoe or casing and which are dismounted or dismantled by the successive removal of the various segment shaped sections of the core. Furthermore, it is well known in the tire art that when a tire-shoe casing has been built up, upon a sectional core in an unvulcanized condition, the core and casing or shoe are enclosed in a suitable mold during the vulcanizing operation.

In order to effectually stretch the fabric employed in the building up of the shoe or casing various means have heretofore been resorted to, so that an even tension or density is present in the finished product. Ordinarily this result is accomplished by building the tire on a solid core which is removed as soon as the building up process is completed and an air bag is inserted in place of the building core. The tire is then placed within the cavity of a two part mold and the air bag is inflated either before or during vulcanization.

Considerable time is consumed in removing the building core and substituting the air bag. Such air bags soon become permanently expanded and enlarged when in constant use necessitating very frequent replacement.

One of the objects of my invention is to provide an air bag which may be used as a yielding surface for the tire building core while the tire is being built thereon and which may be inflated to stretch the tire carcass before or during vulcanization.

A further object is to provide an air bag the usefulness of which will not be impaired by the permanent enlargement occasioned by continual use.

With the foregoing and other objects in view the invention consists in the novel construction, combination and arrangement of parts constituting the invention to be hereinafter specifically described and illustrated in the accompanying drawings which form a part hereof, wherein is shown the preferred embodiment of the invention, but it is to be understood that changes, variations and modifications can be resorted to, which come within the scope of the matter hereinafter claimed.

In the drawings in which similar reference numerals indicate like parts in the different figures, Figure 1 is a transverse sectional view of a device embodying the present invention; said section being taken approximately on line 1 of Figure 2, and;

Figure 2 is a longitudinal section taken approximately on line 2 of Figure 1.

Referring to the drawings in detail the reference numeral 1, designates a core comprising a plurality of segment-shaped sections arranged in annular formation, as the customary practice in the tire building art, and one of said sections designated by the reference numeral 2 is wedge shaped to constitute a key section as is the customary practice, and the ends thereof are adapted to abut against the ends of contiguous sections three and four. As is well known in the tire building art, each section is hollowed or cored out to provide a recess 5 for

air bag may be used repeatedly until worn out, when a fresh air bag may be substituted therefor.

It is equally obvious that should the air bag permanently stretch or expand, the utility of the same will not be impaired as the circumferentially extending channel 9 can be constructed of sufficient depth to allow a material variation in the size of said air bag.

Having thus described my invention I claim:

1. A tire building and stretching core comprising an annular rigid core member, a flexible, hollow, elastic annulus constructed in the form of a tube flattened and folded upon itself so that approximately one-half of its wall is concentrically arranged in respect to the other half, the inner side of said annulus conforming to and arranged upon the peripheral and lateral face of the core and the outer side thereof conforming to the inner face of the tires to be constructed thereon, and means to inflate and deflate said annulus.

2. A tire building and stretching core comprising an annular rigid core member, a flexible, hollow, elastic annulus constructed in the form of a tube flattened and folded upon itself so that approximately one-half of its wall is concentrically arranged in respect to the other half, the inner side of said annulus conforming to and arranged upon the peripheral and lateral face of the core and the outer side thereof conforming to the inner face of the tire to be constructed thereon, and means to inflate and deflate said annulus comprising a tubulous member extending inwardly through the rigid core member.

3. A tire shoe building and stretching core comprising an annular rigid core member, the peripheral and lateral face of which are cut away to provide a positioning surface, an air bag on said surface comprising a flexible, elastic hollow annulus constructed in the form of a tube flattened and folded upon itself so that approximately one-half its wall is concentrically arranged in respect to the other half, the inner side of said annulus conforming to the peripheral and lateral face of the core and the outer side thereof conforming with the inner surface of the tire to be constructed thereon, and means to inflate and deflate said air bag comprising a tubulous member extending radially through said core.

4. A tire shoe building and stretching core comprising an annular core member of rigid material, the peripheral and lateral face of which conforms concentrically with the inner face of the tire to be built or vulcanized thereon, said peripheral and lateral face constructed substantially smaller than the inner face of the tire to allow a positioning surface, an annular air bag on said surface constructed in the form of a collapsed elastic tube so that one-half of the wall thereof is concentrically arranged in respect to the other half, the inner surface thereof conforming to the peripheral and lateral face of the core and the outer surface thereof conforming to the inner wall of the tire to be built or vulcanized thereon, said core having a circumferential extending undercut groove in each lateral face to accommodate the inwardly extending edges of said air bag, and means to inflate said air bag.

5. A tire shoe building and stretching core including a core member formed of a plurality of separable sections which, when assembled end to end, form a rigid annulus, the peripheral and lateral face of which conforms concentrically with the inner face of the tire to be built or vulcanized thereon, said peripheral and lateral face constructed substantially smaller than the inner face of said tire; an annular air bag constructed in the form of a collapsed elastic tube so that one-half of the wall thereof is concentrically arranged in respect to the other half, the outer surface thereof conforming to the inner wall of the tire to be manufactured thereon, said air bag covering the peripheral and lateral face of said core, and means to inflate said air bag.

6. A tire shoe building and compacting or stretching core including an annular rigid core member having an inflatable annular member of elastic non-metallic material upon the periphery thereof, said inflatable member, when collapsed, forming with the core member a substantially rigid core for the building of a tire shoe thereon, and means to introduce air within said inflatable member to compact or stretch said tire shoe.

7. A tire shoe building and compacting or stretching core including an annular rigid core member having its peripheral surface cut away, an inflatable annular member of elastic non-metallic material within the cutaway portion of said core member, said inflatable member, when collapsed, forming with the core member a substantially rigid core for the building of a tire shoe thereon, and means to introduce air within said inflatable member to compact or stretch said tire shoe.

8. A tire shoe building and compacting or stretching core including an annular rigid core member having an expansible and contractible means on the periphery thereof, said means, when contracted, forming with the core member a substantially rigid core for the building of a tire shoe thereon, and means to expand said expansible and contractible means to compact or stretch said tire shoe.

9. A tire shoe building and compacting or stretching core including an annular rigid core member having an expansible and contractible pneumatic means on the periphery thereof, said means, when contracted, forming with the core member a substantially rigid core for the building of a tire shoe thereon, and means to expand said expansible and contractible means to compact or stretch said tire shoe.

10. In combination a tire core having a shape substantially conforming to the interior surface of a tire casing and inflatable, elastic, non-metallic means interposable between the tire casing and said core.

11. A tire building core comprising an annular rigid core conforming in shape to the tire to be built thereon, and an inflatable, elastic, non-metallic sheath positioned around the peripheral portions of said core.

12. A hollow, inflatable, elastic, non-metallic member adapted to be positioned upon the peripheral and lateral face of a tire core in a deflated condition so as to provide in connection therewith a form upon which a tire may be built up.

13. A hollow, inflatable, elastic, non-metallic member adapted to be positioned upon the peripheral and lateral face of a tire core in a deflated condition so as to provide in connection therewith a form upon which a tire may be built up, and means to inflate said member during the vulcanization of a tire constructed thereon.

14. A distensible member of non-metallic elastic material adapted to be positioned upon the peripheral and lateral face of a tire core, so as to normally provide in combination therewith, a form upon which a tire may be built, and means to distend said member during the vulcanization of the tire.

15. In combination with a tire core, an inflatable sheath of non-metallic elastic materials adapted to cover the peripheral portions of said core and provide in connection therewith, when collapsed, a form upon which a tire carcass may be built up.

16. In combination with a tire core, an inflatable sheath of non-metallic elastic material adapted to cover the peripheral portions of said core and provide in connection therewith, when collapsed, a form upon which a tire casing may be built up, and means to inflate said sheath and distend said casing.

17. In combination, a tire core, having a shape substantially conforming to the shape of a tire casing to be constructed thereon, but offset smaller around the peripheral and lateral portions thereof, and an inflatable sheath of non-metallic elastic material covering the peripheral portions of said core so as to provide in connection therewith when collapsed, a form upon which a tire casing may be built up, and means to inflate said sheath and distend said casing after the building up process has been completed.

18. A fluid-tight, hollow, elastic, non-metallic mantle, and a core within said mantle.

19. In combination, a fluid-tight, hollow, elastic, non-metallic mantle, and a core provided with an inlet for introducing an expanding fluid to said mantle.

In testimony whereof I have hereunto set my hand in presence of two subscribing witnesses.

ELNO H. TRUMP.

Witnesses:
SYLVESTER HEIDEGER.
H. R. EWING.